Figure 1:
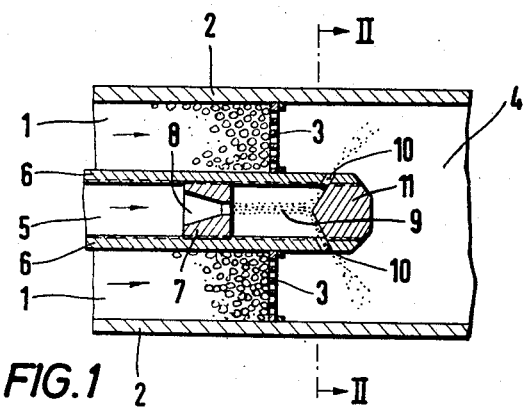

United States Patent

Giesemann

[15] 3,703,345
[45] Nov. 21, 1972

[54] APPARATUS FOR CONTINUOUS MIXING OF TWO LIQUID AGENTS TO OBTAIN A FOAMED SYNTHETIC PRODUCT

[72] Inventor: Herbert Giesemann, Don Boscostr. 3, 53 Bonn, Germany

[22] Filed: June 12, 1970

[21] Appl. No.: 45,761

[30] Foreign Application Priority Data

June 12, 1969   Germany..........P 19 29 887.4

[52] U.S. Cl. .................425/4, 425/134, 425/447, 425/DIG. 50
[51] Int. Cl. .........................................B29d 27/04
[58] Field of Search..18/4 B, 4 S, 5 P, 12 F, DIG. 50; 425/4, 134, 447

[56] References Cited

UNITED STATES PATENTS 3,301,935   1/1967   Stoeckhert...............18/5 P X
3,394,430   7/1968   Stephanoff et al....18/DIG. 50
3,197,531   7/1965   Wilbur..................18/4 B UX
3,403,203   9/1968   Schirmer.............18/12 F UX

FOREIGN PATENTS OR APPLICATIONS 398,962   3/1966   Switzerland................18/12 F Primary Examiner—H. A. Kilby, Jr.
Attorney—Lowry, Rinehart, Markva and Smith

[57] ABSTRACT

Apparatus for continuously forming a foamed synthetic resin product comprises concentric conduits for feeding foam material in the outer conduit and aqueous synthetic resin solution in the inner conduit. The inner conduit includes a nozzle and an impingement device for atomizing the stream of the aqueous synthetic resin solution after which it is projected into the foam material to form the foam product.

13 Claims, 8 Drawing Figures

PATENTED NOV 21 1972 3,703,345

SHEET 1 OF 2

INVENTOR
HERBERT GIESEMANN
BY
Lowry, Rinehart, Markva & Smith 3,703,345

APPARATUS FOR CONTINUOUS MIXING OF TWO LIQUID AGENTS TO OBTAIN A FOAMED SYNTHETIC PRODUCT

This invention relates to an apparatus for continuously mixing two liquid agents to obtain a foamed synthetic resin product in particular a polycondensation resin, e.g. urea resin.

It is known to carry out continuous mixing of two components for the production of a foamed product by guiding the two components in two coaxially disposed pipes under pressure and conveying them to one common chamber in which the components are joined and mixed resulting in a stable foamed product. This is, for instance, a method of preparing synthetic resin foams from synthetic resin solutions, by foaming the foam-forming aqueous solution together with compressed air. By means of the concentric admission the aqueous synthetic resin solution is sprayed into the foam material. The foam material usually contains a catalyst the collision between the synthetic resin particles and the foam composition instantly causing the formation of a gelling synthetic resin foam. A good commixture of the foam composition with the aqueous synthetic resin solution is obtained by deviating the direction of a pressurized fine synthetic resin jet by impinging it against an impingement plate or the like, so that the synthetic resin particles so deviated penetrate into the flow of the foam composition. The arrangement of the impingement plate in the mixing chamber has disadvantages. Due to a characteristic adhesion of the gelling flow of the foam composition at the fittings of the plate and at the outer circumferential faces, feeding of the formed foamed product is hindered during continuous operation. Swirls and neckings frequently are obtained in the product. Thus the homogenous mixture of the two components may be considerably affected.

It is an object of the invention to provide for the continuous mixing of two aqueous agents for the formation of a foamed product of plastic or the like, an arrangement providing also during continuous operation an optimum mixture of the two components with unimpeded passage through the device. In the device with concentric admission of foam composition to the synthetic resin solution and with the use of an impingement plate for deviating the synthetic resin solution to an approximately radial direction to penetrate into the foam composition, the invention is characterized in that within the feed pipe for the synthetic resin solution, there is provided a nozzle, with the impingement plate located beyond said nozzle in the feed pipe at a predetermined distance from it. This will effectively cause turbulence during the continuous confluence of the synthetic resin solution in the foam composition, so that the substantially atomized synthetic resin solution may embrace uniformly the very fine foam laminae without shattering them. A further object of the invention is to prevent the possibility of the gelling synthetic resin foam adhering to the outer surface of the impingement plate or in the mixing chamber. The intensity of spraying of the synthetic resin solution into the foam composition is increased, thus maintained. Furthermore since the impingement plate is some distance from the foam material better distribution of resin solution in the foam material is obtained. This will permit a substantially more uniform gelling process over the cross section of the mixing chamber, so that a homogeneous gelling of the synthetic resin foam product throughout the total cross section is obtained. At the same time, spraying of synthetic resin solution into the foam composition is effected so carefully that there is no scattering of the foam bubbles and foam laminae so that the foamed product is homogeneous.

It is advantageous to provide an overhung arrangement of the impingement plate within the feed pipe wherein an outlet nozzle orifice leading to the mixing chamber is disposed in the feed pipe beyond the impingement plate. This will permit an improved spraying effect for the liquid synthetic resin particles, before they arrive at the foam composition. The total uniform embracing of the foam bubbles and foam laminae by means of the synthetic resin solution is essentially improved and this effectiveness is constant. The foamed product itself gives a more homogenous impression.

In addition, the mixing chamber may have a neck portion a predetermined distance beyond the outlet for the synthetic resin solution. The contraction forming the neck should be conveniently tapered at both sides of the neck. This will compell the synthetic resin solution and the bubbles and laminae of the foam composition to come into closer contact which will favorably influence the homogeneity of the product.

In the case of the preparation of foamed products having a relatively large cross section which may be essentially rectangular, square or polygonal, it is recommended that the total cross section of the product to be formed be subdivided into a great number of mixing chambers arranged closely side by side. It will thus be possible to achieve a homogeneous mixing and gelling of the components to be combined over the whole relatively large cross section of the product. Furthermore it is advantageous to provide that the diameter of the central outlet orifices for the synthetic resin solution is smaller than that of the corresponding outlet orifices at the perimeter. This will ensure uniformity of structure of the foamed product to be formed.

Figure 2:
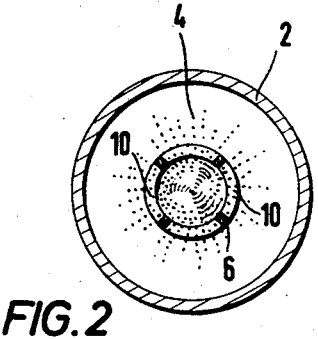

The invention will now be described with reference to the accompanying drawings which illustrates, by way of example, preferred embodiments thereof, and in which FIGS. 1 and 2 are longitudinal and cross sectional views respectively, FIG. 2 being taken on the line II—II of FIG. 1, of a first embodiment of the apparatus of the invention for the continuous mixing of two aqueous agents to form a foamed product.

Figure 3:
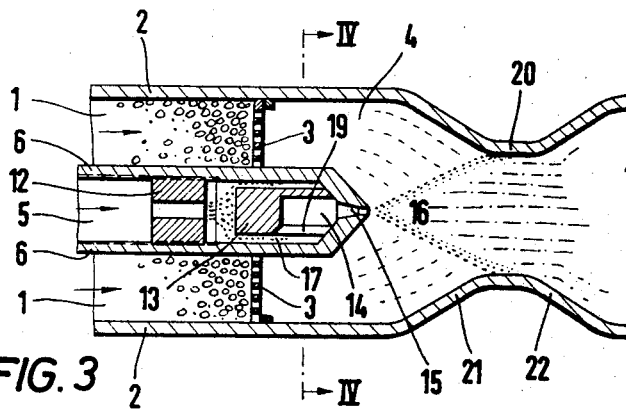
Figure 4:
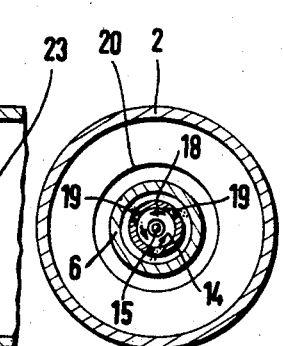

FIGS. 3 and 4 also exhibit a longitudinal section and cross section respectively, FIG. 4 being taken on the line IV—IV of FIG. 3, of a further embodiment of the apparatus according to the invention.

Figure 5:
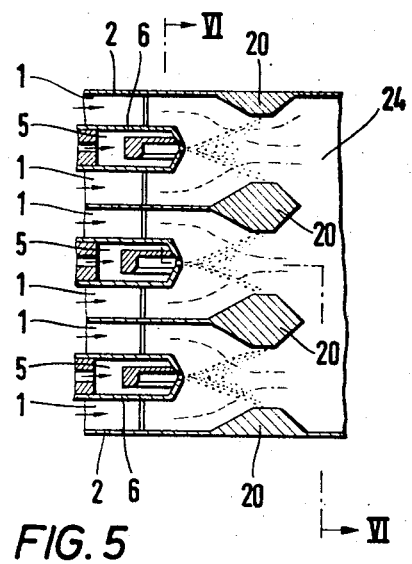
Figure 6:
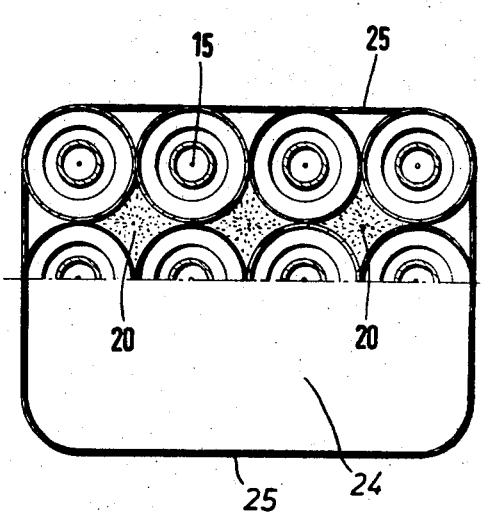

FIGS. 5 and 6 display longitudinal and cross sectional views respectively, FIG. 6 being taken on the line VI—VI of FIG. 5, of an arrangement with a multiplicity of mixing chambers for the formation of a foamed product having a greater cross section.

Figure 7:
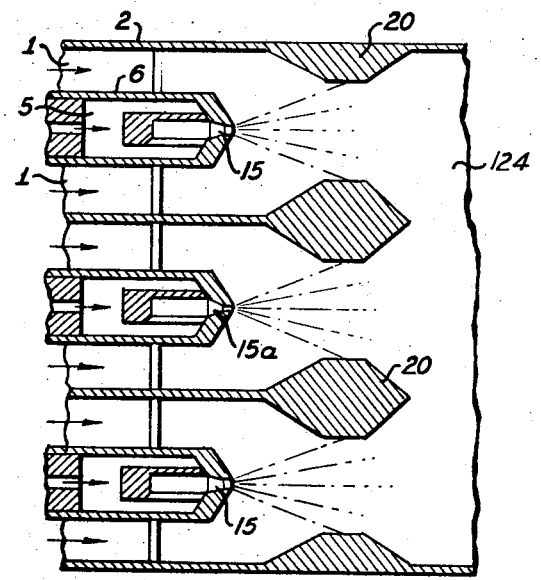
Figure 8:
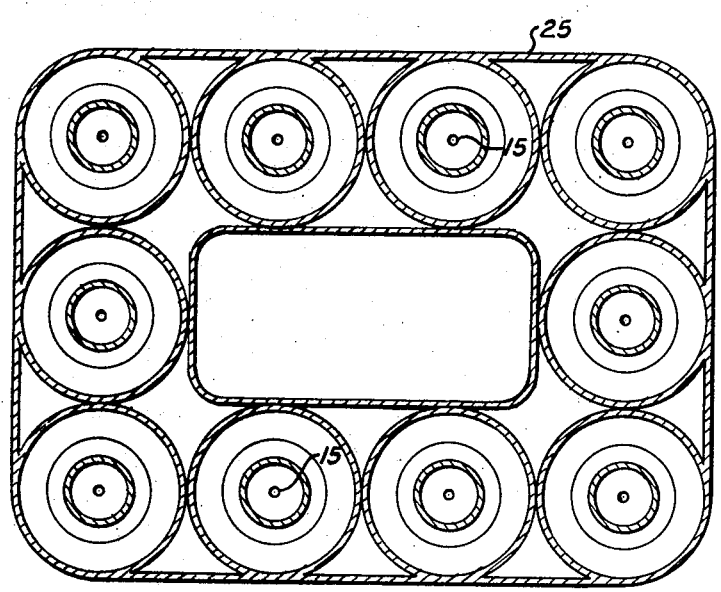

FIG. 7 is a longitudinal cross-sectional view of a further embodiment of the invention, and FIG. 8 is a cross-sectional view of a still further embodiment of the invention.

The apparatus for the mixture of a synthetic resin foam with an aqueous synthetic resin solution to get a stable synthetic resin foamed product has two coaxially disposed pipes 2 and 6. Compressed air and foam liquid is fed through the annular chamber 1 of these two pipes, the foaming taking place by means of frits or the like. The ready foam enters mixing chamber 4 through the perforated annular plate 3. The aqueous synthetic resin solution is supplied through chamber 5 of the central pipe 6. At a predetermined distance from the end of pipe 6, there is provided part 7 with nozzle orifice 8, through which a predetermined flow rate may be maintained. Moreover, the nozzle will increase the discharge speed of the aqueous synthetic resin solution from the nozzle body 7. The latter is screwed advantageously in pipe 6, and its position may be adjusted with respect to the end of pipe 6. An impingement plate 11 is provided at a predetermined distance from nozzle body 7 and screwed in pipe 6, the face of said impingement plate being preferably tapered. The jet of the aqueous synthetic resin solution being discharged from the nozzle orifice impinges on impingement plate 11 and leaves more or less radially through apertures 10 in pipe 6 in a finely divided condition to permeate uniformly the passing annular flow of the foam composition. In the subsequent mixing chamber 4 which is free from any components, the fine foam laminae and bubbles are uniformly embraced by the atomized synthetic resin solution whereby uniform gelling takes place to form the stable foamed product. As obvious from FIG. 2, the outlet orifices 10 extend over a large angular range e.g. about 90° so that the finely sprayed synthetic resin solution may enter freely the mixing chamber 4.

The embodiment according to FIGS. 3 and 4 provides an arrangement permitting a further increase in dissolution of the liquid synthetic resin particles. Nozzle body 12 is mounted adjustably in the central feed pipe for the synthetic resin solution. It is followed at a predetermined distance in the flow direction of the solution by impingement plate 13, fitted such as to form an annular space 17 between it and the inner wall of pipe 6. Holder 18 for impingement member 13 is provided with openings 19 extending essentially in tangential direction. This will impart an impinging effect to the flowing synthetic resin solution in space 14, whereupon the solution may enter mixing chamber 4 through opening 15.

Due to the impartation of a twist or helical effect to the solution discharged from opening 15, the penetration of the solution in the passing foam composition is increased. The homogenous confluence of the synthetic resin solution delivered under twist effect with the foam bubbles and so on of the foam composition may become still more effective by providing the pipe 2 at a predetermined distance from opening 15 with a neck 20, the transitional areas 21 and 22 from pipe 2 to contraction 20 and from the latter to the enlarging pipe being tapered. The flow of foam composition in the axial direction will be then easily deviated and the the conically supplied jet 16 of synthetic resin solution impinges on the foam composition flow deviated by contraction 20 at an angle at which the path of the synthetic resin solution will cross relatively sharply the foam composition path. Most favorable results for an optimum mixture may be obtained with a taper angle of about 30° to about 60°. Accordingly, walls 21 are accomodated to contraction 20 so that the mixed synthetic resin foam is released immediately during the gelling process in the adjacent space 23. The ready synthetic resin foam leaving space 23 takes the shape of the walls of the space 23, i.e. a cylindrical shape.

For the manufacture of foamed products having a relatively large cross section and which should have a rectangular or polygonal cross section or the like as a finished product it is advisable to provide a multiplicity of individual units with mixing chambers 4 or 23 closely arranged side by sides so that the then resulting mixing chamber 24 will have the desired large cross section for the foamed product.

FIGS. 5 and 6 show a multiplicity of individual units arranged such that the circumferential line 25 of the units provided side by side and one above the other shows a rectangular cross section which may have rounded corners or corners of angular shape with respect to each other. In this case, chambers 4 of the individual units open out following the contraction 20 into a common mixing chamber 24 which may have any desired cross section subject to the arrangement of the individual units so that the finished foamed product may have a square or polygonal cross section with larger dimensions and with the guarantee of a homogenous commixture of the components throughout the whole and relatively large cross section.

A particular advantage with this arrangement as shown in FIG. 7 is that the individual units feeding the marginal zones of the formed square body resulting in the finished synthetic resin product may discharge more synthetic resin liquid than the individual units which are in a more central position. This may be easily achieved by providing a smaller diameter for the openings 15a of the central individual units than for the corresponding openings 15 in the marginal zones. The final product obtained has a higher mechanical resistance at the marginal zones of the square body to deflection, buckling etc. It is also possible for, hollow products such as tubular items with a circular, square or polygonal cross section to be produced by simply omitting the individual units in the center as shown in FIG. 8. Each individual unit operating in an optimum manner within a limited area will ensure that the whole, relatively large cross section of the product displays a foam composition which is homogenous.

The homogenous mixing of both components may be carried out under increased temperature, e.g. up to about 100° C. The mechanically obtained atomization may be maintained up to the temperature of solidification of the mixed product. Due to this arrangement, foams, in particular aminoplast resin foams with volumetric weights of more than 30 kg/cbm, and up to a volumetric weight of about 100 gk/cbm and more may produced. The synthetic resin foam obtained has the resistance required in the particular field of application together with a high resistance to pressure and to bending strain required e.g. for plates etc.

What is claimed is:

1. Apparatus for continuously forming a foamed synthetic resin product by projecting aqueous synthetic resin solution into a foam material comprising a. first conduit means, said first conduit means including a mixing chamber, b. second conduit means generally centrally located within said first conduit means forming an annular passage between said first and second conduit means for conducting said foam material along a path contiguous to said second conduit means into said mixing chamber, said second conduit means being adapted for conducting said synthetic resin solution, c. a nozzle at the end of said second conduit means communicating with said mixing chamber, d. orifice means in said second conduit means upstream of said nozzle for forming a high-speed stream of said synthetic resin solution as it passes therethrough, and e. impingement means in said second conduit means between said orifice means and said nozzle, a passage being provided around said impingement means within said second conduit means, f. whereby said aqueous synthetic resin solution is first atomized by said impingement means, and the atomized solution passes along said passage and is further atomized when passing through said nozzle, said impingement being isolated isolated from contact with said foam material preventing accumulation of foam product thereon, and said atomized synthetic resin solution comes into immediate contact with said foam material upon passing through said outlet.

2. An apparatus as claimed in claim 1 wherein said first and second conduit means and said mixing chamber are cylindrical and said first and second conduit means are arranged concentrically.

3. Apparatus as claimed in claim 2 wherein said outlet comprises a plurality of apertures in said second conduit means arranged annularly about said impingement means whereby said atomized aqueous synthetic resin solution is projected radially directly through said apertures into said foam material.

4. Apparatus as claimed in claim 1 further comprising an annular cylinder concentrically located within said second conduit means and extending between said impingement means and said nozzle-like opening and providing an annular space between the interior wall of said second conduit means and the exterior wall of said annular cylinder, and a plurality of elements arranged in tangential form on said annular cylinder for creating a spiral flow pattern in said atomized aqueous synthetic resin solution as it passes through said annular space and is projected conically from said further nozzle.

5. Apparatus as claimed in claim 2 wherein said means defining a mixing chamber includes a contracted neck portion having tapered walls on opposite sides thereof.

6. A composite apparatus for continuously forming a foamed synthetic resin product comprising means defining an enlarged tubular chamber and a plurality of the apparatuses as claimed in claim 1 in parallel contiguous relationship at one end of said tubular chamber, the adjacent mixing chambers of said apparatuses communicating with said enlarged chamber whereby a single foamed synthetic resin product is produced from said contiguous plurality of said apparatuses.

7. A composite apparatus as claimed in claim 6 wherein the circumference of said enlarged chamber is in the shape of a circle.

8. A composite apparatus as claimed in claim 6 wherein the cross section of the openings in the outlets of the centrally located apparatuses are smaller than those in the marginal areas, whereby higher mechanical resistance is obtained adjacent the perimeter of said product compared with the interior thereof.

9. A composite apparatus as claimed in claim 6 wherein said plurality of apparatuses are arranged about an area having none of said apparatuses, whereby the foamed synthetic resin product is hollow.

10. Apparatus as claimed in claim 3 wherein said impingement means includes a convex conical impingement surface extending radially to said apertures in said second conduit means.

11. A composite apparatus as claimed in claim 6 wherein the circumference of said enlarged chamber is in the shape of a rectangle.

12. A composite apparatus as claimed in claim 6 wherein the circumference of said enlarged chamber is in the shape of a polygon.

13. A composite apparatus for continuously forming a foamed synthetic resin product comprising a. means defining an enlarged tubular chamber and a plurality of apparatuses for forming foamed synthetic resin by projecting aqueous synthetic resin solution into a foam material, b. each of said plurality of apparatuses comprising first conduit means, said first conduit means including a mixing chamber, second conduit means generally centrally located within said first conduit means forming an annular passage between said first and second conduit means for conducting said foam material along a path contiguous to said second conduit means into said mixing chamber, said second conduit means being adapted for conducting said synthetic resin solution and including at least one outlet communicating with said mixing chamber, orifice means in said second conduit means upstream of said outlet for forming a high-speed stream of said synthetic resin solution as it passes therethrough, and impingement means in said second conduit means downstream of said orifice means for diverting and atomizing said high-speed stream of synthetic resin solution prior to its passing through said outlet and directly into the foam material in said mixing chamber, whereby said impingement means is isolated from contact with said foam material preventing accumulation of foam material thereon, and said atomized synthetic resin solution comes into immediate contact with said foam material upon passing through said outlet, c. said plurality of apparatuses being in parallel contiguous relationship at one end of said tubular chamber, the adjacent mixing chambers of said apparatuses communicating with said enlarged chamber, d. whereby a single foamed synthetic resin product is produced from said contiguous plurality of said apparatuses.

* * * * *